United States Patent Office 3,849,514
Patented Nov. 19, 1974

3,849,514
BLOCK POLYESTER-POLYAMIDE COPOLYMERS
Theodore F. Gray, Jr., and Kenneth R. Barton, Kingsport, Tenn., assignors to Eastman Kodak Company, Rochester, N.Y.
No Drawing. Continuation of abandoned application Ser. No. 683,789, Nov. 17, 1967. This application Sept. 5, 1969, Ser. No. 856,907
Int. Cl. C08g 41/04
U.S. Cl. 260—857 PE    14 Claims

ABSTRACT OF THE DISCLOSURE

Block polyester-polyamide having improved segment stability and useful in the manufacture of fibers, films, coatings, adhesives, and molded objects are prepared by the melt reaction of prepolyesters containing hydroxy end groups and prepolyamides containing ester or hydroxyester end groups.

---

This application is a continuation of application Ser. No. 683,789, filed Nov. 17, 1967, now abandoned.

This invention relates to block polyester-polyamide having improved copolymer block stability. This invention also relates to a process for preparing such block polyester-polyamide copolymers.

A number of patents (e.g., British 610,140; Belgian 661,784; and Netherlands 6410530) have been issued for polyester-polyamide compositions. However, in many cases, continued heating (such as in melt processing) of these compositions produces more and more randomization; and, as a result, the properties (e.g., melting point, inherent viscosity) may be lowered.

Normally, the melt blending of polyesters and polyamides results in rapid randomization. However, we have discovered that the melt reaction of prepolyesters containing hydroxy end groups and prepolyamides containing ester or hydroxyester end groups produces segmented or block polyester-polyamides. These polymers are unique in that they maintain their segmented character without appreciable randomization under the conditions normally used for melt processing. This unusual and unexpetced segment stability of the block copolymers can be clearly demonstrated when the prepolyester and prepolyamide exhibit crystalline melting transitions. The resulting high polymers then exhibit two melting transitions corresponding to the melting transitions of the component homopolymer segments. Furthermore, the melting transitions and melting peak sizes as determined by differential scanning calorimetry do not indicate randomization of the polyester-polyamide segments or blocks on heating as is observed with other melt-blended polyester-polyamide mixtures. However, this invention is not limited to crystalline prepolyamides and prepolyesters since segmented polymers are produced equally as well when one or both of the prepolymers is amorphous. For instance, if an amorphous prepolyester and an amorphous prepolyamide are reacted to produce a block polyester-polyamide copolymer, two glass transition temperatures are observed representative of the original prepolyester and prepolyamide segments or blocks.

Our polymeric compositions containing alternate polyester and polyamide segments in the polymer chains are particularly valuable since many of the desirable properties of the individual segments are retained. Since heating our polymeric compoitsions at 290° C. up to two hours does not appreciably randomize these segments or blocks, their properties are not appreciably degraded during conventional melt processing methods.

Specifically, a method has been devised for preparing, without appreciable randomization, polymer chains containing alternate polyester and polyamide segments or blocks, said polymer chains having the following general structure:

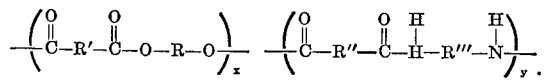

It is an object of this invention to provide segmented polyester-polyamides having improved segment stability. Another object of this invention is to prepare polyester-polyamides capable of maintaining segmented character during heating in the melt phase. A further object of this invention is to prepare polyester-polyamide copolymers which are valuable for the manufacture of fibers, films, molded objects protective coatings, and hot-melt adhesives. A further object of this invention is to prepare polyester-polyamide fibers which have improved dye affinity. Another object of this invention is to prepare polyester-polyamide fibers useful in the manufacture of tire cord. Other objects of this invention will appear herein.

These objects are attained through the practice of this invention, at least one embodiment of which comprises providing a segmented or block polyester-polyamide copolymer prepared by catalytically reacting:

(A) A prepolyamide, having an inherent viscosity of at least about 0.1 and terminated with hydroxyester or ester end groups, of a difunctional diamine component and a second component seletced from the group consisting of:

(1) a molar excess of a diester of a difunctional dicarboxylic acid, and
(2) a difunctional dicarboxylic acid and a terminating agent selected from the group consisting of monohydric and dihydric alcohols, wherein said acid is used in a molar amount greater than that for said diamine and wherein said terminating agent is added after the reaction between said diamine and said acid in an amount of one mole of monohydric or dihydric alcohol per equivalent of excess acid present, and (B) A prepolyester, having an inherent viscosity of at least about 0.1 and terminated with hydroxy end groups, of a difunctional dicarboxylic acid and a molar excess of a difunctional diol, said block copolymers having stable blocks, a polyamide content of from about 10 to 60% by weight of the block copolymer, and an inherent viscosity of at least 0.5.

Another embodiment of this invention provides a process for the preparation of a segmented or block polyester-polyamide copolymer, said process comprising:

(A) Preparing a prepolyamide, having an inherent viscosity of at least about 0.1 and terminated with hydroxy ester or ester end groups, of a difunctional diamine component and a second component selected from the group consisting of:

(1) a molar excess of a diester of a difunctional dicarboxylic acid, and
(2) a difunctional dicarboxylic acid and a terminating agent selected from the group consisting of monohydric and dihydric alcohols, wherein said acid is used in a molar amount greater than that for said diamine and wherein said terminating agent is added after the reaction between said diamine and said acid in an amount of one mole of monohydric or dihydric alcohol per equivalent of excess acid present (B) Preparing a prepolyester having an inherent viscosity of at least about 0.1 and terminated with hydroxy end groups, of a difunctional dicarboxylic acid and a molar excess of a difunctional diol, and (C) Catalytically reacting said prepolyamide and said prepolyester to obtain polymerization, said segmented or block polyester-polyamide copolymers having stable blocks, a polyamide content of from about 10 to 60% by weight of the copolymer, and an inherent viscosity of at least 0.5.

It is essential to the practice of this invention that the prepolyamide have either ester or hydroxy ester end groups and that the prepolyester have hydroxy end groups.

The above-referred to prepolyamide and prepolyester have an inherent viscosity of from about 0.1 to about 0.5, and the final segmented or block polyester-polyamide copolymer has an inherent viscosity of at least 0.5. The prepolyamide content of the block copolymer ranges from about 10 to 60% by weight of the copolymer. Whenever the term "inherent viscosity" (I.V.) is used in this application, it will be understood to refer to viscosity determinations made at 25° C. using 0.25 gram of polymer per 100 ml. of a solvent composed of 60 percent phenol and 40 percent tetrachloroethane.

In general, any aliphatic, alicyclic, and aromatic difunctional diamine can be used to prepare the prepolyamide. Examples of such diamines include polymethylenediamines of the formula $H_2N(CH_2)_xNH_2$, wherein $x$ is a positive integer of from 2 to 12 (such as diamethylenediamine, trimethylenediamine, tetramethylenediamine, pentamethylenediamine, hexamethylenediamine, heptamethylenediamine, octamethylenediamine, monamethylenediamine, decamethylenediamine, undecamethylenediamine, and dodecamethylenediamine); 1,1-, 1,2-, 1,3-, and 1,4-cyclohexanebis(methylamines); o-, m-, and p-xylene-$\alpha,\alpha'$-diamines; 1,2-, 1,3-, and 1,4-cyclohexanediamines; 3-methylhexamethylenediamine; 3-methylheptamethylenediamine; 2,4-diamethylhexamethylenediamine; 2,4-toluenediamine; p,p'-diphenyldiamine; 1,4-dimethyl-3,5-diaminobenezene; 2,5-norcamphanebis(methylamine); o-, m-, and p-phenylenediamines; 2,5-, 2,6-, and 2,7-naphthalenediamines; benzidine; 4,4'-methylenedianiline; and 3,4'-diaminodiphenyl. The N,N'-diphenyldiamines of U.S. Pat. 3,297,656 can also be employed.

In general, any aliphatic, alicyclic, and aromatic difunctional dicarboxylic acid (or esters thereof, as explained below) can be used to prepare the prepolyamide and prepolyester. Examples of such acids include oxalic; malonic; dimethylmalonic; succinic; glutaric; adipic; trimethyl adipic; pimelic; 2,2-dimethylglutaric; azelaic; sebacic; suberic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; t-butyl isophthalic; 2,5-norbornanedicarboxylic; 1,4-naphthalic; diphenic; 4,4'-oxydibenzoic; diglycolic; theiodipropionic; 2,2,4-trimethyladipic; 4,4'-sulfonyldibenzoic; 2,5-naphthalenedicarboxylic; 2,6-naphthalenedicarboxylic; and 2,7 - naphthalenedicarboxylic acids. It will be understood that the corresponding esters of these acids are included in the term "dicarboxylic acid." Examples of these esters include dimethyl-1,4-cyclohexanedicarboxylic; dimethyl - 2,6-naphthalenedicarboxylate; dimethyl-4,4'-sulfonyldibenzoate; dimethyl isophthalate; dimethyl terephthalate; and diphenyl terephthalate.

In general, any aliphatic, alicyclic, and aromatic difunctional diols can be used to prepare the prepolyester. Examples of such diols include ethylene glycol;
propylene glycol;
diethylene glycol;
1,2-propylene glycol;
2,4-dimethyl2-ethylhexane-1,3-diol;
2,2,4-trimethyl-1,3-pentanediol;
2,2-dimethyl-1,3-propanediol;
2-ethyl-2-butyl-1,3-propanediol;
2,2-diethyl-1,3-propanediol;
2-methyl-2-propyl-1,3-propanediol;
2-ethyl-2-isobutyl-1,3-propanediol;
1,3-butanediol;
1,4-butanediol;
1,5-pentanediol;
1,6-hexanediol;
2,2,4-trimethyl-1,6-hexanediol;
1,2-cyclohexanedimethanol;
1,3-cyclohexanedimethanol;
1,4-cyclohexanedimethanol;
2,2,4,4-tetramethyl-1,3-cyclobutanediol;
o-, m-, and p-xylylene diols;
4,4'-sulfonyldiphenol;
4,4'-oxydiphenol;
4,4'-isopropylidenediphenol; and
2,5-naphthalenediol.

In general, any monohydric or dihydric alcohol can be used as the terminating agent to prepare the prepolyamide having hydroxy end groups. Examples of suitable monohydric alcohols include methyl, ethyl, propyl, butyl, pentyl, hexyl, heptyl, octyl, nonyl, and decyl alcohols; phenol; chlorophenol; naphthol; and chloronaphthol. Examples of suitable dihydric alcohols include those glycols specifically mentioned above. The terminating agent is added in an amount of one mole of monohydric or dihydric alcohol per equivalent of excess acid present.

Pre-copolyamides and pre-copolyesters also can be used in the practice of this invention. These compounds can be prepared from one or more of the above diamines, acids, esters, and glycols.

Block polyester-polyamide copolymers prepared in the previously described manner from poly(ethylene terephthalate) and poly(hexamethylene azelamide) prepolymers exhibited melting transitions as detected by differential scanning calorimetry (DSC) at 245° to 250° C. and 190° to 200° C. which were not affected either in size or position on heating at 270° to 290° C. for periods up to two hours. The melting transitions corresponded, respectively, to those observed for the original individual prepolymers. Furthermore, the ratio of melting peak sizes obtained for the resulting block polymer was the same as that expected from the calculated mole ratio of prepolymers employed. The presence of two distinct melting transitions is proof that the amide and ester repeating units are not random but present in segments or blocks.

Polymers prepared in this manner were shown not to be mere physical blends by solvent extraction techniques. For example, a segmented polyester-polyamide, inherent viscosity 1.16, composed of poly(ethylene terephthalate) and 50 mole percent poly(hexamethylene azelamide) was extracted with boiling trifluoroacetic acid in methylene chloride (1:10 v./v.). A total of only ten percent of the original weight of polymer was removed by three successive extractions. The inherent viscosity of the extracted material was 0.17. Poly(ethylene terephthalate) is soluble in this solvent mixture under these conditions while the poly(hexamethylene azelamide) is insoluble.

The reaction of the prepolyamide and prepolyester is preferably accomplished with an ester-interchange catalyst. In general, any of the known ester-interchange catalysts can be employed with effectiveness. Examples of such catalysts include tin, manganese, magnesium, titanium, zinc, cobalt, calcium, aluminum, zirconium, and compounds thereof. These and other suitable catalysts are disclosed in U.S. Pats. 2,465,319; 2,720,502; 2,720,503; 2,720,504; 2,720,505; 2,720,506; 2,720,507; 2,727,881; and 3,068,205. Preferred catalysts include the acetates of zinc, manganese, calcium, and magnesium; manganese benzoate; and titanium tetraisopropoxide.

The above-referred to polymerization may be accomplished by either melt or solid phase methods. These methods are well known in the art (see, for example, U.S. Pats. 2,901,466 and 3,075,952) and need not be detailed herein.

This invention will be further illustrated by the following examples of preferred embodiments, although it will be understood that these examples are included merely for purposes of illustration and are not intended to limit the scope of the invention.

EXAMPLE 1

Eighty-five grams of diphenyl azelate (0.25 mole) and 31.9 grams of hexamethylenediamine (0.275 mole) are placed in a flask and heated with stirring at 175° to 205° C. under nitrogen. The temperature is raised slowly (about 45 minutes) to 255° C. When the evolution of phenol is complete, the reaction is placed under reduced pressure (about one mm.) and heated at 255° C. for one hour. The reaction flask is cooled under nitrogen, and the polymer is removed. The resulting prepolymer has an inherent viscosity of 0.46 and a crystalline melting point of 208° to 211° C.

One hundred thirty-five and eight-tenths grams of dimethyl terephthalate (0.7 mole), 86.8 grams ethylene glycol (1.4 moles), and 0.126 grams of titanium tetraisopropoxide in butanol are placed in a flask and heated with stirring at 175° to 206° C. under nitrogen. After rapid distillation of methanol ceases (about 1½ hours), the temperature is raised to 275° C. (over about one hour). The reaction is allowed to cool under nitrogen. The prepolymer has an inherent viscosity of 0.12 and a crystalline melting point of 251° to 252° C.

Twenty-six and eight-tenths grams of prepoly(hexamethylene azelamide) (0.1 mole), 19.2 grams prepoly(ethylene terephthalate) (0.1 mole), and 0.018 gram of titanium tetraisopropoxide in butanol are placed in a flask and heated with stirring at 265° C. under nitrogen. The flask is heated at 265° C. to 275° C. for about 15 minutes, and then it is placed under reduced pressure (about 0.5 mm.) for about 45 minutes. The flask is cooled under nitrogen. The resulting yellowish, opaque, tough polymer is removed from the flash. The polymer has an inherent viscosity of 1.16 and crystalline melting transitions at 198° and 239° C. The polymer is proved not to be a physical blend but a chemically combined segmented or block polyester-polyamide copolymer by extraction.

The homopolyester, poly(ethylene terephthalate) is found to be soluble in a solvent mixture consisting of one part trifluoroacetic acid and ten parts methylene chloride (volume/volume). On the other hand, the homopolyamide, poly(hexamethylene azelamide), is not soluble in this solvent mixture. The chemical bonding between the polyester and polyamide segments is demonstrated by successive extractions of the resulting polyester-polyamide described above with the trifluoroacetic acid-methylene chloride solvent mixture. Thus, 1.3383 grams of the polymer (ground to pass No. 20 sieve) is extracted with three successive 40 ml. portions of boiling trifluoroacetic acid-methylene chloride (1:10 v./v.) solvent mixture. A total 0.1309 gram or 9.8 percent of the weight of the polymer is removed by this treatment. Only 0.0176 or 1.3 percent is removed by the last of the three extractions. The inherent viscosity of the extracted material is 0.17.

Furthermore, unlike physical blends or blends which react to give transitory blocks, the segmented or block poly(ethylene terephthalate) - poly(hexamethylene azelamide) copolymer is injection molded without destroying the segmented chain. The molded tensile bars are very strong and do not craze or crack when bent double. Clear, tough films are produced from this polymer having greater solvent resistance and utility in packaging.

EXAMPLE 2

The procedure of Example 1 is followed to prepare a prepolyester of dimethyl terephthalate and ethylene glycol and a prepolyamide of diphenyl azelate and hexamethylenediamine.

Ninety-six grams of prepoly(ethylene terephthalate) (0.5 mole and inherent viscosity of 0.21), 20.1 grams prepoly(hexamethylene azelamide) (0.075 mole and inherent viscosity of 0.46), and 0.036 gram of titanium tetraisopropoxide in butanol are placed in a flask and heated with stirring at 265° C. under nitrogen (about 15 minutes). The flask is placed under reduced pressure (about 0.5 mm.) and held at 265° to 270° C. for about 45 minutes. The flask is cooled under nitrogen, and the polymer is removed from the flask.

The polymer has an inherent viscosity of 0.59 and has crystalline melting transitions at 207° and 250° C. The two melting transitions again show the uniqueness of this invention, since the poly(hexamethylene azelamide) segment a block is in low concentration and even a small amount of randomization would have destroyed its segmented identity. The segmented or block polyester-polyamide copolymer is injection molded to give strong, tough, molded bars.

EXAMPLE 3

A sample of block poly(ethylene terephthalate) with 20 mole percent poly(hexamethylene azelamide) prepared as in Examples 1 and 2 is tested for segment heat stability. The segmented polymer after melt build-up is heated at about 280° C. under nitrogen, and samples are taken at about 30-minute intervals. The samples are analyzed by differential scanning calorimetry. It is found that very little change in melting transition temperature or peak size occurs for heating periods up to two hours. The two melting transitions are in the 246° to 252° C. and 187° to 203° C. ranges and are in a size ratio expected from the molar composition of the block polymer. Normal polymer blends heated in the melt randomized rapidly as is evidenced by the merging and disappearance of the melting transitions and reduction of the inherent viscosity (see Example 4).

EXAMPLE 4

A dried, granular mixture of 60.0 grams poly(ethylene terephthalate), inherent viscosity 0.32, which is prepared by the reaction of dimethyl terephthalate and ethylene glycol, and 21.0 grams of poly(hexamethylene azelamide), inherent viscosity 0.42, which is prepared by the polymerization of hexamethylene diamine and azelaic acid, is placed in a polymerization flask fitted with a mechanical stirrer and nitrogen inlet. After evacuating and flushing the flask and contents several times with dry nitrogen, the mixture is heated with stirring by means of a metal bath in the range of 280° to 285° C. for 15 minutes, producing a molten, viscous mass. The pressure in the polymerization flask is then reduced to approximately five mm. Hg while stirring is continued for an additional 20 minutes. A sample of the molten polymer mass is then withdrawn for viscosity and differential scanning calorimetry measurements. Stirring under vacuum at this temperature is continued with samples being withdrawn every 30 minutes for two hours thereafter. The variations of inherent viscosity and crystalline melting transitions with heating time are shown in Table I.

TABLE I.—THE EFFECT OF HEAT ON A MIXTURE OF POLY (ETHYLENE TEREPHTHALATE) AND POLY (HEXAMETHYLENEAZELAMIDE)

| Time, min. | I.V. | Melting transitions by DSC (° C.) | |
|---|---|---|---|
|  | 0.32 and 0.42 a.. | 208 | 251 |
| 0 b | 0.88 | 195 | 243 |
| 30 | 0.85 | 187 | 238 |
| 60 | 0.80 | 176 | 230 |
| 90 | 0.75 |  | 225 |
| 120 | 0.69 |  | c 220 | a Inherent viscosity and melting transitions of the prepolymer.
b Zero time after 15 minutes under nitrogen and 20 minutes under vacuum.
c Peak very broad and small.

This example shows how mixtures of polyesters and polyamides containing amino ($NH_2$) and/or carboxyl (COOH) groups undergo rapid randomization at 280° to 285° C. The lowering of the inherent viscosity and the merging of the two crystalline melting transitions into a single melting range indicates that the initially formed segmented poyester-polyamides are transformed into more and more random copolyester-amides. This is a result of interchange reactions involving amino and carboxyl groups at random points along the polyester-polyamide chain segments. Such randomization does not occur for the segmented or block polyester-polyamides disclosed in this invention, and they thus have an unexpected stability.

EXAMPLE 5

Sixteen and sixteen-hundreths grams of sebacic acid (0.08 mole) and 8.12 grams of hexamethylenediamine (0.07 mole) are placed in a flask and heated at 175° to 200° C. (about ten minutes) under nitrogen. The temperature is raised to 270° to 275° over about 40 minutes. The flask is placed under reduced pressure (about 0.5 mm.) at 275° to 280° C. for about one hour, cooled under vacuum, and removed. Two and fifty-two-hundreths grams of the prepolymer and 0.3 gram of 1,4-cyclohexanedimethanol (0.002 mole) are placed in a three-neck flask and heated with stirring at 230° C. under nitrogen until all solids are molten (about ten minutes). Through a side-neck, 0.036 gram of titanium tetraisopropoxide in butanol is added. The flask is heated at 230° to 240° C. for about ten minutes, and then 19.2 grams of poly(ethylene terephthalate) (0.1 mole) is added through the side-neck. The temperature is rapidly raised to 275° C. (about ten minutes). The flask is placed under reduced pressure (about 0.5 mm.) at 275° to 285° C. for about one hour, cooled under vacuum, and the polymer is removed. The polymer has an inherent viscosity of 0.53 and a crystalline melting transition at 214° and 244° C. Strong, tough fibers can be cold-drawn from the melt.

This example indicates the versatility that can be employed in obtaining a hydroxy-capped prepolyester and an ester-capped prepolyamide which can be reacted to produce a high molecular weight, segmented or block polyester-polyamide copolymer.

EXAMPLE 6

One hundred three and nine-tenths grams of diphenyl isophthalate (0.3 mole) and 56.8 grams of 1,3-cyclohexanebismethylamine (0.4 mole) are placed in a flask and heated with stirring at 205° C. under nitrogen. The temperature is raised to 282° C. over two hours during which phenol distills off. The temperature is maintained at 280° to 290° C. while the reaction is placed under reduced pressure (about one mm.) for about 30 minutes. The moderately viscous prepolymer is cooled under vacuum. The inherent viscosity is 0.35, and the glass transition temperature is 173° C. No crystalline melting transition is found.

Nineteen and four-tenths grams of dimethyl isophthalate (0.1 mole), 18.8 grams of 1,4-butanediol (0.2 mole), and 0.018 gram of titanium tetraisopropoxide in butanol are placed in a flask and heated with stirring at about 200° C. under nitrogen. The temperature is slowly (over about 30 minutes) raised to 220° C. and held until the rapid evolution of methanol stops. The temperature is then raised to 255° C. and the reaction placed under reduced pressure (about one mm.) for 15 minutes. The reaction is cooled under nitrogen. The prepolymer has an inherent viscosity of 0.29 and a glass transition temperature of 10° C. No crystalline melting transition is found.

Twenty-four grams of prepoly(1,3-cyclohexanebismethylene isophthalamide) (0.1 mole), 20.4 grams prepoly(butylene isophthalate) (0.1 mole), and 0.018 gram of titanium tetraisopropoxide in butanol is placed in a flask and heated with stirring at 280° to 290° C. under nitrogen. The flask is heated at 280° to 290° C. for about ten minutes, and then it is placed under reduced pressure (0.5 to 1 mm.) for one hour. The polymer becomes very viscous and wraps up on the stirrer. The reaction is cooled under nitrogen, and the polymer is cut off the stirrer. The polymer is light yellow, very tough, and has an inherent viscosity of 0.96. Examination of the polymer by differential scanning calorimetry reveals two glass transition temperatures at 16° C. and 179° C. The two glass transitions show that the segmented polymer retains the character of the individual prepolymer and is not randomized on heating in the melt phase.

The invention has been described in detail with particular reference to certain preferred embodiments thereof, but it will be understood that variations and modifications can be effected within the spirit and scope of the invention as described hereinabove and as defined in the appended claims.

We claim:

1. A block polyester-polyamide copolymer terminated with ester or hydroxyester end groups prepared by catalytically reacting the terminal groups of a prepolyamide and a prepolyester by means of an ester interchange reaction:
    (A) a prepolyamide, having an inherent viscosity of at least about 0.1 and terminated with hydroxyester or ester end groups, said prepolyamide having been prepared from damine component and a second component selected from the group consisting of:
        (1) a molar excess of a diester of a difunctional dicarboxylic acid, and
        (2) a dicarboxylic acid and a terminating agent selected from the group consisting of monohydric and dihydric alcohols, wherein said acid is used in a molar amount greater than that for said diamine and wherein said terminating agent is added after the reaction between said diamine and said acid in an amount of one mole per equivalent of excess acid present, and
    (B) a prepolyester, having an inherent viscosity of at least about 0.1 and terminated with hydroxy end groups, said prepolyester having been prepared from a difunctional dicarboxylic acid and a molar excess of a difunctional diol,
    (C) said block copolymer having being stabilized against randomation in the molten state and having a polyamide content of from about 10-60% by weight of the block copolymer, and an inherent viscosity of at least 0.5.

2. A segmented polyester-polyamide as defined by Claim 1 wherein said (A) is a prepolyamide of diphenyl azelate and hexamethylenediamine.

3. A segment polyester-polyamide as defined by Claim 1 wherein said (B) is a prepolyester of ethylene glycol and dimethyl terephthalate.

4. A segmented polyester-polyamide as defined by Claim 1 wherein said (A) is a prepolyamide of sebacic acid, hexamethylenediamine, and 1,4-cyclohexanedimethanol.

5. A segmented polyester-polyamide as defined by Claim 1 wherein said (A) is a prepolyamide of 1,3-cyclohexane-bis(methylamine) and diphenyl isophthalate.

6. A segmented polyester-polyamide as defined by Claim 1 wherein said (B) is a prepolyester of 1,4-butanediol and dimethyl isophthalate.

7. A segmented polyester-polyamide as defined by Claim 1 wherein said (B) is a prepolyester of 1,4-cyclohexanedimethanol and dimethyl terephthalate.

8. A process for the preparation of a block polyester-polyamide copolymer terminated with ester or hydroxyester end groups, said process comprising:
    (A) preparing a prepolyamide, having an inherent viscosity of at least about 0.1 and terminated with hydroxyester or ester end groups, prepolyamide having been prepared from a diamine component and a second component selected from the group consisting of:
        (1) a molar excess of a diester of a difunctional dicarboxylic acid, and
        (2) a dicarboxylic acid and a terminating agent selected from the group consisting of monohydric and dihydric alcohols, wherein said acid is used in a molar amount greater than that for said doamine and wherein said terminating agent is added after the reaction between said diamine and said acid in an amount of one mole per equivalent of excess acid present, (B) preparing a prepolyester, having an inherent viscosity of at least about 0.1 and terminated with hydroxy end groups, said polyester having been prepared of a dicarboxylic acid and a molar excess of a difunctional diol, and (C) catalytically reacting the terminal groups of the prepolyamide and prepolyester by an ester interchange reaction to obtain said block copolymer, (D) said block copolymer being stabilized against randomization in the molten state and having a polyamide content of from about 10–60% by weight of the copolymer, and an inherent viscosity of at least 0.5.

9. A process as defined by Claim 8 wherein said prepolyamide is prepared from diphenyl azelate and hexamethylenediamine.

10. A process as defined by Claim 8 wherein said prepolyester is prepared from ethylene glycol and dimethyl terephthalate.

11. A process as defined by Claim 8 wherein said prepolyamide is prepared from sebacic acid, hexamethylene diamine, and 1,4-cyclohexanedimethanol.

12. A process as defined by Claim 8 wherein said prepolyamide is prepared from 1,3-cyclohexanebis(methylamine) and diphenyl isophthalate.

13. A process as defined by Claim 8 wherein said prepolyester is prepared from 1,4-butanediol and dimethyl isophthalate.

14. A process as defined by Claim 8 wherein said prepolyester is prepared from 1,4-cyclohexanedimethanol and dimethyl terephthalate.

References Cited

UNITED STATES PATENTS

| | | | |
|---|---|---|---|
| 3,369,057 | 2/1968 | Twilley | 260—857 |
| 3,378,055 | 2/1968 | Robertson | 260—857 |
| 3,378,056 | 4/1968 | Robertson | 260—857 |
| 3,378,602 | 4/1968 | Robertson | 260—857 |
| 3,382,305 | 5/1968 | Breen | 260—857 |

PAUL LIEBERMAN, Primary Examiner

U.S. Cl. X.R.

260—47 R, 75 R, 78 R